United States Patent [19]

Busch

[11] Patent Number: 5,864,476
[45] Date of Patent: Jan. 26, 1999

[54] POWER SUPPLY APPARATUS

[75] Inventor: Peter Busch, Augsburg, Germany

[73] Assignee: Siemens Nixdorf Informationssysteme Aktiengesellschaft, Paderborn, Germany

[21] Appl. No.: 894,537

[22] PCT Filed: Feb. 6, 1996

[86] PCT No.: PCT/DE96/00178

§ 371 Date: Aug. 21, 1997

§ 102(e) Date: Aug. 21, 1997

[87] PCT Pub. No.: WO96/26571

PCT Pub. Date: Aug. 29, 1996

[30] Foreign Application Priority Data

Feb. 23, 1995 [DE] Germany ............... 195 06 405.4

[51] Int. Cl.[6] .................. H02M 7/00; H02M 3/06
[52] U.S. Cl. .................. 363/69; 363/70; 307/109
[58] Field of Search ............ 363/69, 70; 307/105, 307/109, 43, 44, 64, 86

[56] References Cited

U.S. PATENT DOCUMENTS 4,476,399 10/1984 Yoshida et al. ............... 307/44
4,539,487 9/1985 Ishii .
5,038,265 8/1991 Paladel .
5,319,536 6/1994 Malik ........................... 363/65

FOREIGN PATENT DOCUMENTS

| 0 419 993 | 4/1991 | European Pat. Off. . |
| 33 20 885 A1 | 12/1983 | Germany . |
| 278 011 | 4/1990 | Germany . |
| 39 41 052 | 5/1991 | Germany . |
| WO 92/03773 | 3/1992 | WIPO . |

Primary Examiner—Peter S. Wong
Assistant Examiner—Rajnikant B. Patel
Attorney, Agent, or Firm—Hill & Simpson

[57] ABSTRACT

A power supply apparatus is shown that comprises several identical individual power packs connected in parallel so as to be decoupled from one another. The individual power packs produce coupled output voltages, of which one is adjusted by a pulse duty control and the others are corrected in linear fashion. By means of a correction such that a comparison of target/actual output voltage values is done without, the mean value of all the actual current values is formed, and a mistuning of a respective target/actual current comparison is carried out, a constantly uniform current distribution to the individual power packs is achieved, with a low power loss, fault tolerance via possible redundancy, and the possibility of "hot board replacement."

6 Claims, 1 Drawing Sheet

AMENDED PAGE

POWER SUPPLY APPARATUS

BACKGROUND OF THE INVENTION

The invention concerns a power supply apparatus with identical individual power packs connected in parallel and decoupled from one another, with outputs for coupled output voltages, of which one is respectively adjusted by pulse duty control and the others are corrected by linear correction units.

Computer equipment or tower PCs with higher data processing power require power supply apparatuses with higher power. As a higher-power power supply apparatus, power supply apparatuses consisting of several identical individual power packs are used. The individual power packs are connected in parallel, decoupled from one another. They can be constructed in such a way that they produce coupled output voltages, of which one is adjusted by means of a pulse duty control and the others are adjusted by a linear correction. The linear correction is subject to a loss of power that is all the larger, the larger a derivative action has to be between an incoming voltage to be compensated and an outgoing compensated voltage.

Besides the higher power, additionally increased demands are placed on the fault tolerance of this power supply apparatus. A redundant power supply apparatus is required that continues to supply the computer in case of failure of an individual power pack, without failure or collapse of system voltages.

An additional demand on the power supply apparatus is that a failed individual power pack can be exchanged while the computer is running without voltage collapse. This measure is also known by the term "hot board replacement."

Finally, a uniform distribution of current to the individual power packs should be ensured.

It is known to control the uniform distribution of the current electronically. It is also known to use a separate power pack circuit for each output voltage. It is also known to decouple the outputs from the system voltage inputs of the computer with Schottky diodes, in order to obtain a redundancy given an output short circuit of a defective individual power pack. In addition, it is known to choose the number of individual power packs connected in parallel to be higher by one than the number actually required, in order to obtain in this way a power supply apparatus with redundancy in which defective individual power packs can be exchanged during operation.

The possibility is also known of connecting individual power packs with coupled output voltages in parallel. The output voltage with a highest output current is regulated for uniform current distribution via a pulse duty control. The coupled output(s) are regulated for a uniform current distribution by means of a transistor element as a controlling element in an output line. The regulation of the current distribution can thereby respectively ensue in an identical fashion: a central control block compares each output voltage separately with a target value. The deviation from this target value is amplified and is used as target current of the respective output. The actual current is acquired, is compared with the target value and is corrected correspondingly.

However, this method has the disadvantage that while the uniform current distribution of coupled individual power packs is indeed ensured, the losses due to this type of control are higher than is absolutely necessary. The reason for this is that an output voltage target value is used that is unalterably set, which value is not matched to the actually present output voltages. A power supply apparatus as described above is known from U.S. Pat. No. 5,038,265.

From DE 3 941 052 C1, a circuit arrangement for the parallel connection of power supply units is known, said units comprising a voltage regulation apparatus and a current regulation apparatus operating secondarily thereto, which respectively have identical resistance switching networks, as mean value formation units, between the voltage regulation apparatus and the current regulation apparatus, for the protection of a uniform load distribution to the power supply units connected together in parallel to form a power supply packet, which switching networks are connected with one another via at least one bidirectional control line and calculate a common mean value of a signal for all power supply units, which signal represents a measure for the output power to be emitted.

European reference 0 419 993, a power supply apparatus is known that consists of identical individual power packs decoupled from one another and connected in parallel, comprising outputs for coupled output voltages. With respect to each individual power pack, a pick-off circuit is provided for picking off a coupled output current, allocated to a controlling element within a power pack, as an electrical actual quantity, which circuit comprises among other things a drain connected with threshold switches. Overall, a uniform distribution of current to the individual power packs is effected by the formation of a target value from the mean value of the measured currents. However, the power packs comprise no coupled output voltages such that one is respectively adjusted by a pulse duty control and the others are corrected by linear correction units with a linearly controllable controlling element and a comparator connected with it. The present power supply apparatus thus does not solve the problem of ensuring a correction with minimal power loss and simultaneous uniform current distribution to the individual power packs connected in parallel in power supply apparatuses of this sort.

The aim of the invention is to ensure a correction of output voltages in a power supply apparatus of the type named above, with a minimal power loss and simultaneous uniform current distribution to the individual power packs connected in parallel.

SUMMARY OF THE INVENTION

In the regulation of coupled outputs connected in parallel on which these features are based, a comparison of target value and actual value of the output voltage in order to obtain a target current value is no longer carried out. The target current value is obtained by forming the mean value of all the actual current values.

Due to tolerances in the target/actual current comparators, these would either respectively completely turn on the respective correction transistors that act as controlling elements or would shut them off entirely. In order nonetheless to bring the current distribution mechanism to functioning, a deliberate mistuning of the respective target/actual current comparator is carried out by means of a drain. In this way, each correction transistor will turn on completely at the beginning. In the individual power pack with the lowest output voltage, the current, and thereby the common target current value, will then sink until the common target current value compensates the deliberate mistuning of the remaining target/actual current comparators. By this means, the remaining correction transistors come into the control range, and produce a uniform current distribution with a small deviation caused by the mistuning. This deviation can be disregarded given suitable dimensioning. Since the correction transistor with the lowest output voltage continues to remain completely switched on, the lowest possible power loss arises in all the individual power packs.

Since the correction addressed above ensures the lowest possible residual voltage over the correction transistors, the tasks of the decoupling diodes and the correction transistors can be taken over by a common component: by an n-channel MOSFET transistor whose drain diode points in the direction of the output current flow. The difference between the drain-diode residual voltage and the residual voltage of the turned-on correction transistor of about 0.5 volts then serves for the correction of tolerances in the output voltages of the individual power packs connected in parallel.

To produce the decoupling between the individual power packs, the MOSFET correction transistors can be arranged in such a way that their drain diodes are arranged opposite to the direction to the output of the power supply apparatus, and that decoupling diodes are provided that are arranged in such a way that they are poled in the reverse direction in relation to a reverse current. The same effect can also be produced by connecting the MOSFET correction transistors in such a way that their drain diodes are arranged in the direction of the output of the power supply apparatus. The decoupling diodes formerly required can then be omitted. In an individual power pack with an output short circuit, a proper MOSFET correction transistor must be actively switched off in case of a reverse current flow. For this purpose, only an additional operational amplifier is for example necessary. Nonetheless, this alternative has the advantage that with the omission of the decoupling diode, which for example has to be able to handle 5 A, for which a cooling is required, the cooling is also omitted, including the assembly it requires.

A possibility for the realization of the mistuning is given by a voltage distributor, one of whose two resistances is used for the drain. A circuit component equipped with a Zener diode would also be possible for the drain.

A realization of the mistuning such that the mistuning is related to a negative auxiliary voltage has the advantage of control over the critical situation in which no current at all is let through by the associated individual power pack.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENTS

Figure 1:
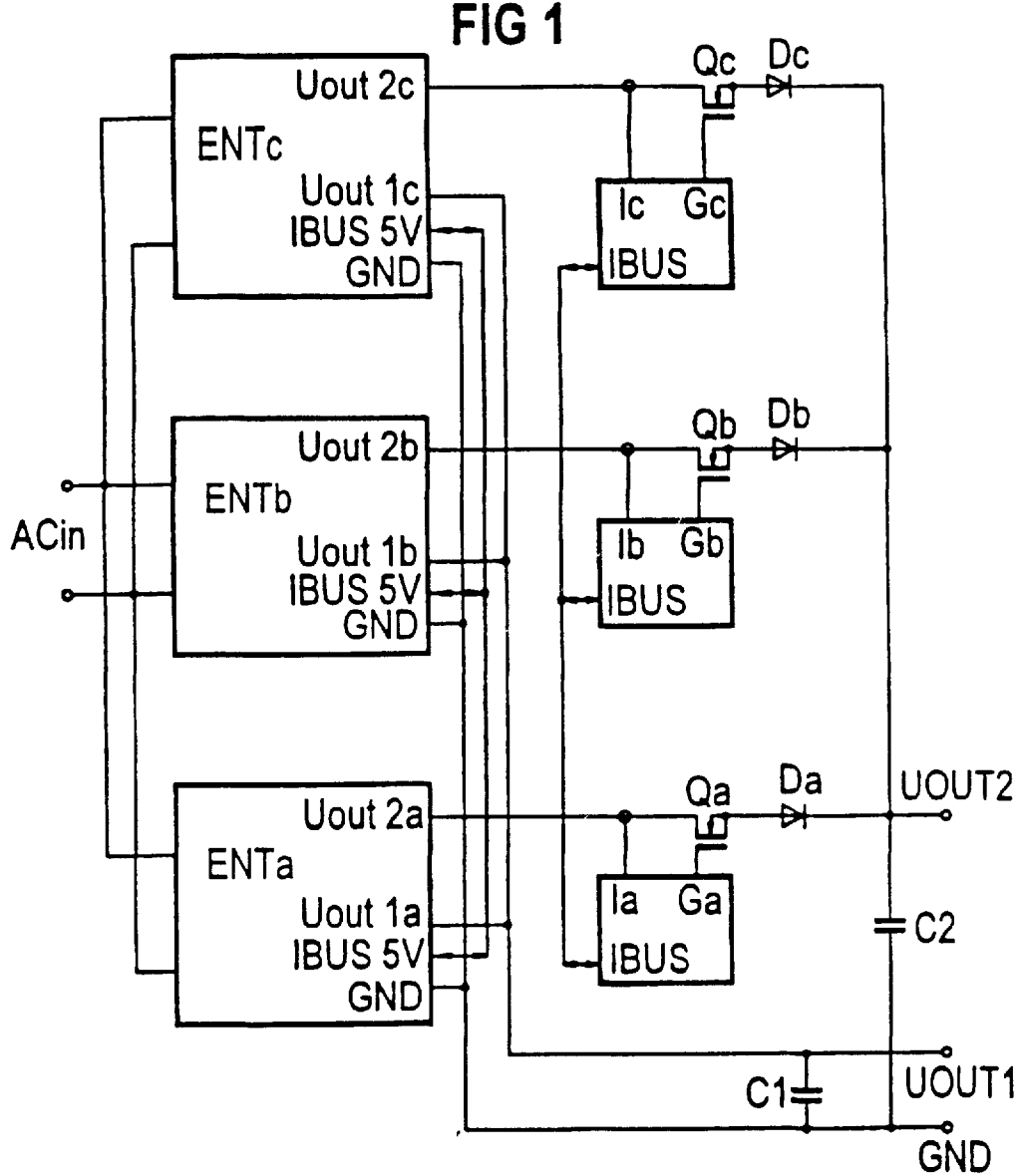
FIG. 1 shows a diagram of a parallel circuit of individual power packs decoupled via diodes, with coupled output voltages.

FIG. 1 shows a power supply apparatus that comprises several identical individual power packs ENTa; ENTb; ENTc. The individual power packs ENTa; ENTb; ENTc produce specific output voltages Uout1a, Uout2a; Uout1b, Uout2b; Uout1c, Uout2c, coupled to a ground GND. The output voltages Uout1a, Uout1b and Uout1c can be for example a 5 volt voltage, adjusted via a pulse duty control. The output voltages Uout2a, Uout2b and Uout2c are for example a 12 volt voltage.

The individual power packs ENTa; ENTb; ENTc are connected in parallel at the input side and are connected to an input network alternating voltage ACin. At the output side, the individual power packs ENTa, ENTb, ENTc are likewise connected in parallel per output voltage produced. The individual power packs are parallelized in relation to the 5 volt output voltage via a parallel 5 volt bus line IBUS5V. A uniform current distribution to the individual power packs ENTa, ENTb, ENTc ensues via acquisition of the 5 volt output current or primary input current, mean value formation via the 5 volt bus line IBUS5V and correction of the primary pulse duty corresponding to the voltage at the 5 volt bus line IBUS5V (compare the reference DE 3 941 052 C1, mentioned above). A decoupling of the individual power packs in relation to the 5 volt output voltage is to be assumed within the boxes for the individual power packs. It is not additionally shown for the 5 volt output voltage in FIG. 1. The 5 volt output voltage is smoothed to an output voltage UOUT1 of the power supply apparatus via an output capacitor C1.

The same holds analogously for the 12 volt output voltage of the individual power packs ENTa, ENTb, ENTc, which is smoothed to an output voltage UOUT2 of the power supply apparatus via an output capacitor C2. The only difference is that the 12 volt output voltage is coupled to the 5 volt output voltage. The exact adjustment takes place via a linear correction.

The 12 volt voltages of the individual power packs ENTa; ENTb; ENTc are respectively corrected before the parallel circuit by means of linear correction units, as mentioned. The linear correction units comprise controlling elements Qa, Qb, Qc that can be controlled in linear fashion. The controlling elements Qa, Qb, Qc are connected in series with decoupling diodes Da, Db, Dc. The decoupling diodes Da, Db, Dc are poled in the direction of the output of the power supply apparatus.

Figure 2:
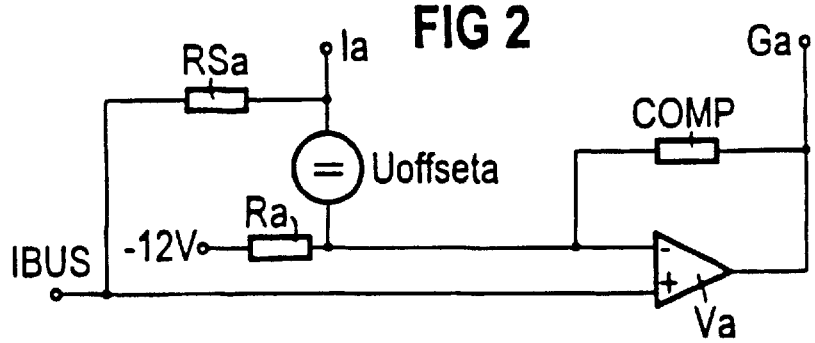
FIG. 2 shows a diagram of the current regulation according to the invention.

Each correction unit has a circuit part, shown as a box in FIG. 1, whose internal activity is shown in more detail in FIG. 2. Overall, the circuit part, shown as a box, receives the output current to be corrected via a pick-off circuit. The supplying ensues via lines Ia, Ib, Ic. The picking off can for example ensue by means of a shunt resistance.

The controlling elements Qa, Qb, Qc are controlled from a respective box via lines Ga, Gb, Gc. A line IBUS connects the individual boxes of the correction units.

As an example, FIG. 2 shows in more detail the structure of the box from FIG. 1 belonging to the individual power pack designated ENTa. The representation can be carried over analogously to the boxes for the individual power packs designated ENTb and ENTc in FIG. 1.

In the box shown in more detail, a comparator Va is shown that is wired with a compensation Comp for the removal of the oscillation tendency. The comparator Va can be an operational amplifier with a negative and a positive output. The compensation Comp is connected between the negative output and the output of the comparator Va.

The output of the comparator Va is connected with the line Ga. The negative input of the comparator Va is connected to a negative voltage potential via a resistance Ra. In the exemplary embodiment, the negative voltage potential is −12 volts.

A drain Uoffseta is connected to the negative input of the comparator Va. The connection ensues via one of the terminal sides of the drain. With the other terminal side, the drain Uoffseta is connected with a terminal side of a resistance component RSa and with the line Ia.

The other terminal side of the resistance component RSa is connected with a positive input of the comparator Va and with the line IBUS.

The drain Uoffseta can for example be formed by a resistance that forms a voltage divider together with the resistance Ra. However, the drain Uoffseta could also be formed by a Zener diode and two resistances.

The comparator Va carries out a comparison of a target current with an actual current. The target current is present at the positive input and the actual current is present at the negative input of the comparator Va.

In order to avoid repetitions, with respect to the specification of the manner of functioning of the power supply apparatus indicated in FIGS. 1 and 2, reference is made to the introductory part of the present documents.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. Power supply apparatus, having identical individual power packs decoupled from one another and connected in parallel, comprising:

outputs for coupled output voltages of a respective individual power pack, of which one output is respectively adjusted by a pulse duty control and other outputs are corrected by linear correction units with a controlling element that is controllable in linear fashion and with a comparator connected with a control input of the controlling element, which comparator compares an electrical target quantity with an electrical actual quantity and correspondingly controls the controlling element dependent on a result of the comparison;

a pick-off circuit allocated before each linearly controllable controlling element for picking off a coupled output current allocated to the controlling element as an electrical actual quantity, which pick-off circuit is at connected respectively with first terminal sides of a resistance component and with a drain, of which the drain is connected, with a second terminal side, with an input for an actual quantity of the comparator, and the resistance component is connected, with a second terminal side, with an input for a target quantity of the comparator, and the pick-off circuit connected with a bus line that is respectively connected with the second terminal sides of the resistance components of the correction units of respective further individual power packs that are connected in parallel, and thereby providing a target current value that is obtained by forming a mean value of all actual current values; and respectively allocated pick-off circuits having drains dimensioned such that a defined mistuning of a respective target/actual current comparison is effected.

2. The power supply apparatus according to claim 1, wherein the controlling elements are formed by MOSFET transistors whose drain diode is arranged opposite to a direction to an output of the power supply apparatus, and wherein mutual decoupling of the individual power packs are formed for each of the output voltages identical among themselves by decoupling diodes, which are poled in a direction of flow of current of a respectively associated output current, and which are connected together at an output side to form an overall output for a resulting overall output voltage.

3. The power supply apparatus according to claim 1, wherein the controlling elements are formed by MOSFET transistors whose drain diode is arranged in a direction to an output of the power supply apparatus, and wherein the controlling elements for each identical output voltage among the individual power packs are connected together at an output side to form an overall output for a resulting overall output voltage.

4. The power supply according to claim 1, wherein the drain for a picked-off electrical actual quantity is a resistance.

5. The power supply according to claim 1, wherein the drain for a picked-off electrical actual quantity is at least one Zener diode.

6. The power supply apparatus according to claim 1, wherein a redundancy is provided by additionally providing an individual power pack in relation to a predetermined number of individual power packs.

* * * * *